Jan. 12, 1937.  H. C. MEAD ET AL  2,067,722
DOORLESS HEADLAMP WITH LENS MOUNTED OUTSIDE OF HOUSING
Filed April 2, 1934  4 Sheets-Sheet 1
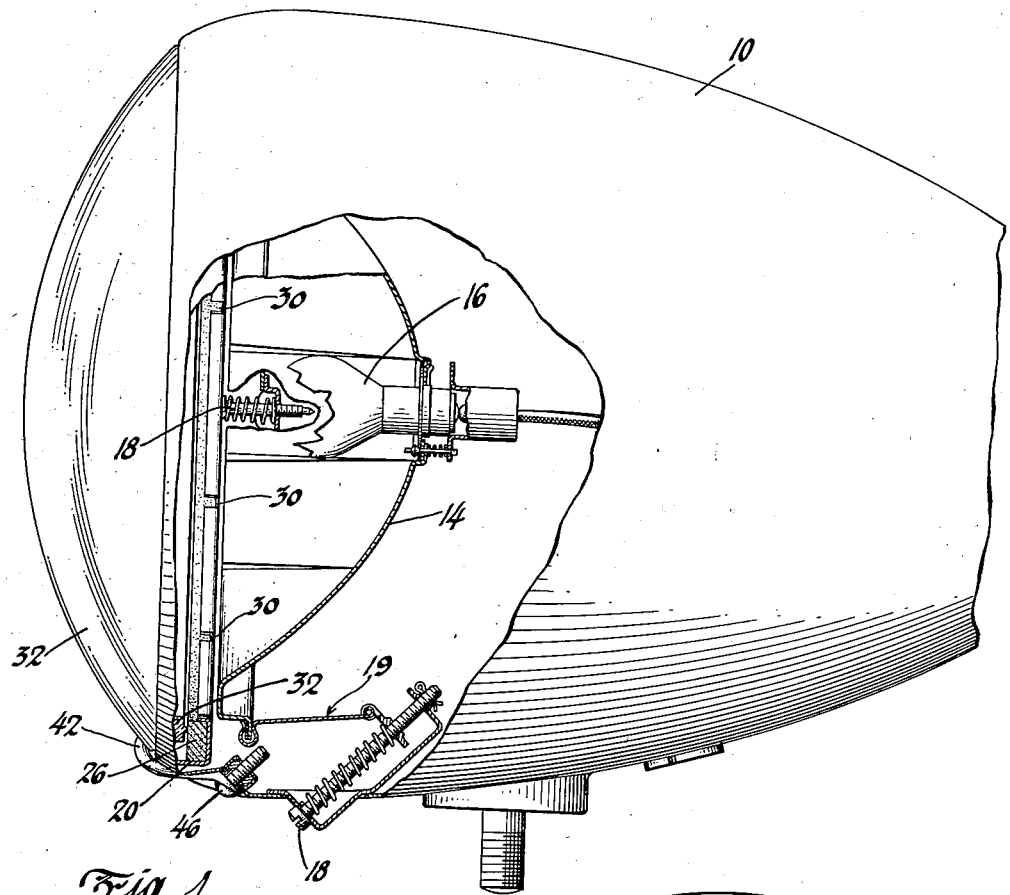
Fig. 1
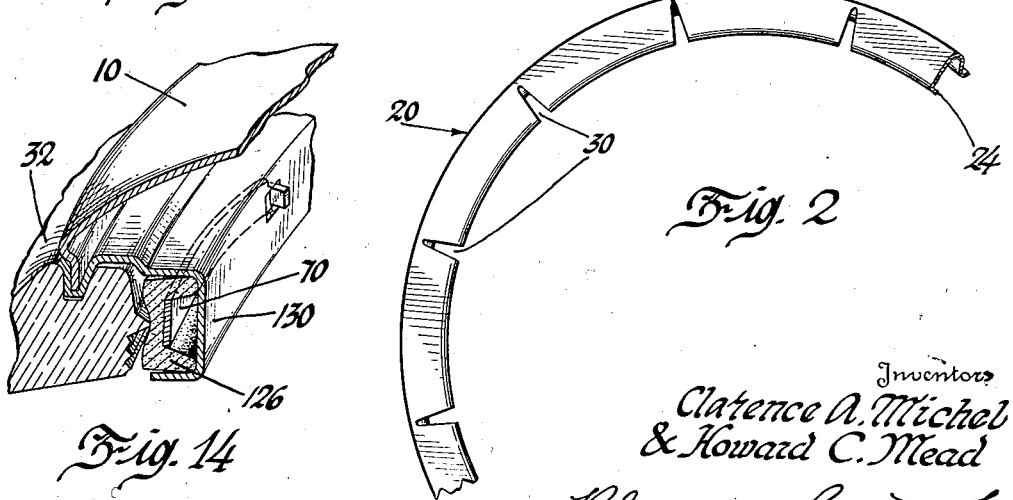
Fig. 14
Fig. 2
Inventors
Clarence A. Michel
& Howard C. Mead
By Blackmore, Spencer & Flint
Attorneys Jan. 12, 1937. H. C. MEAD ET AL 2,067,722
DOORLESS HEADLAMP WITH LENS MOUNTED OUTSIDE OF HOUSING
Filed April 2, 1934 4 Sheets-Sheet 2

Inventors
Clarence A. Michel
& Howard C. Mead
By Blackmore, Spencer & Hurd
Attorneys

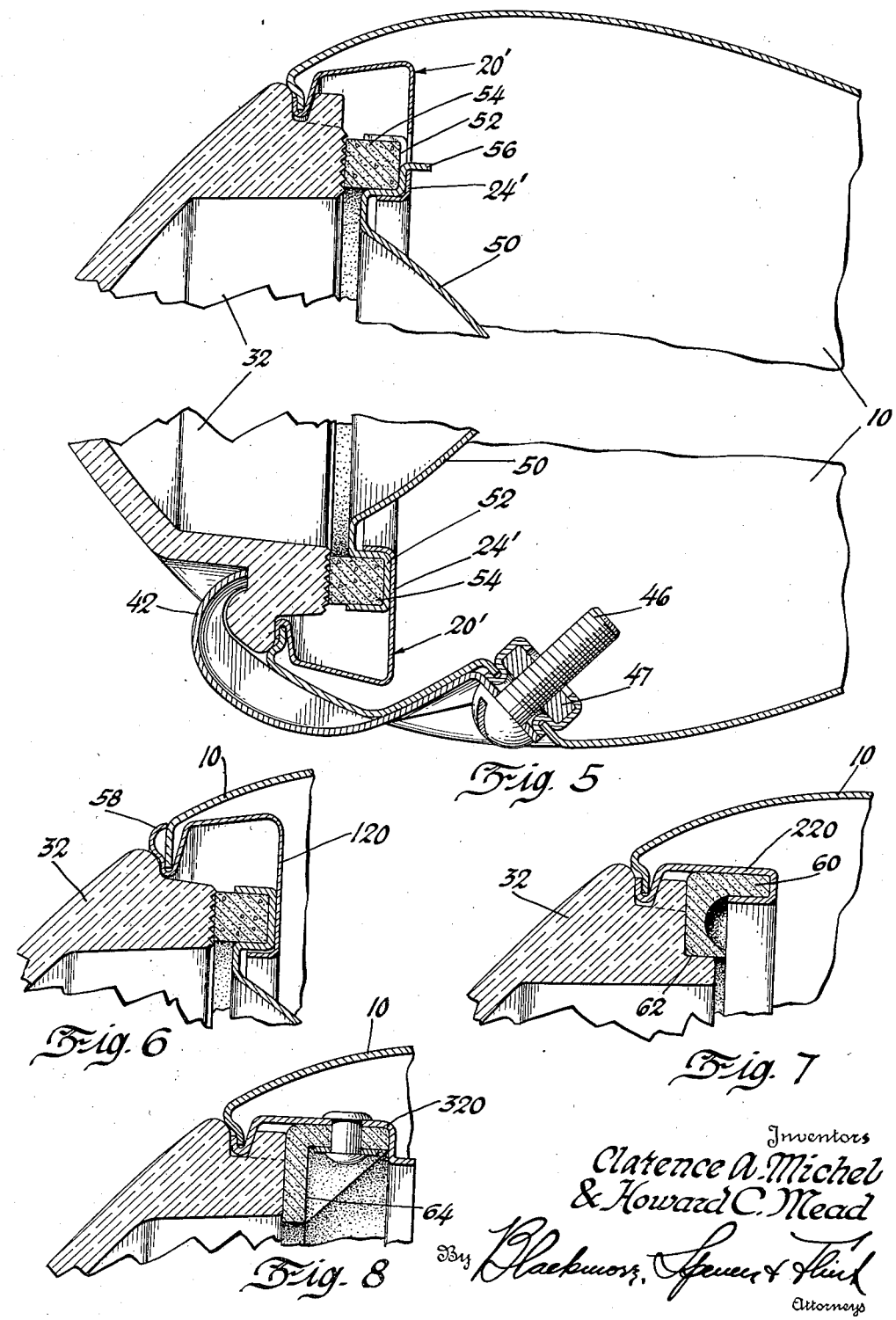

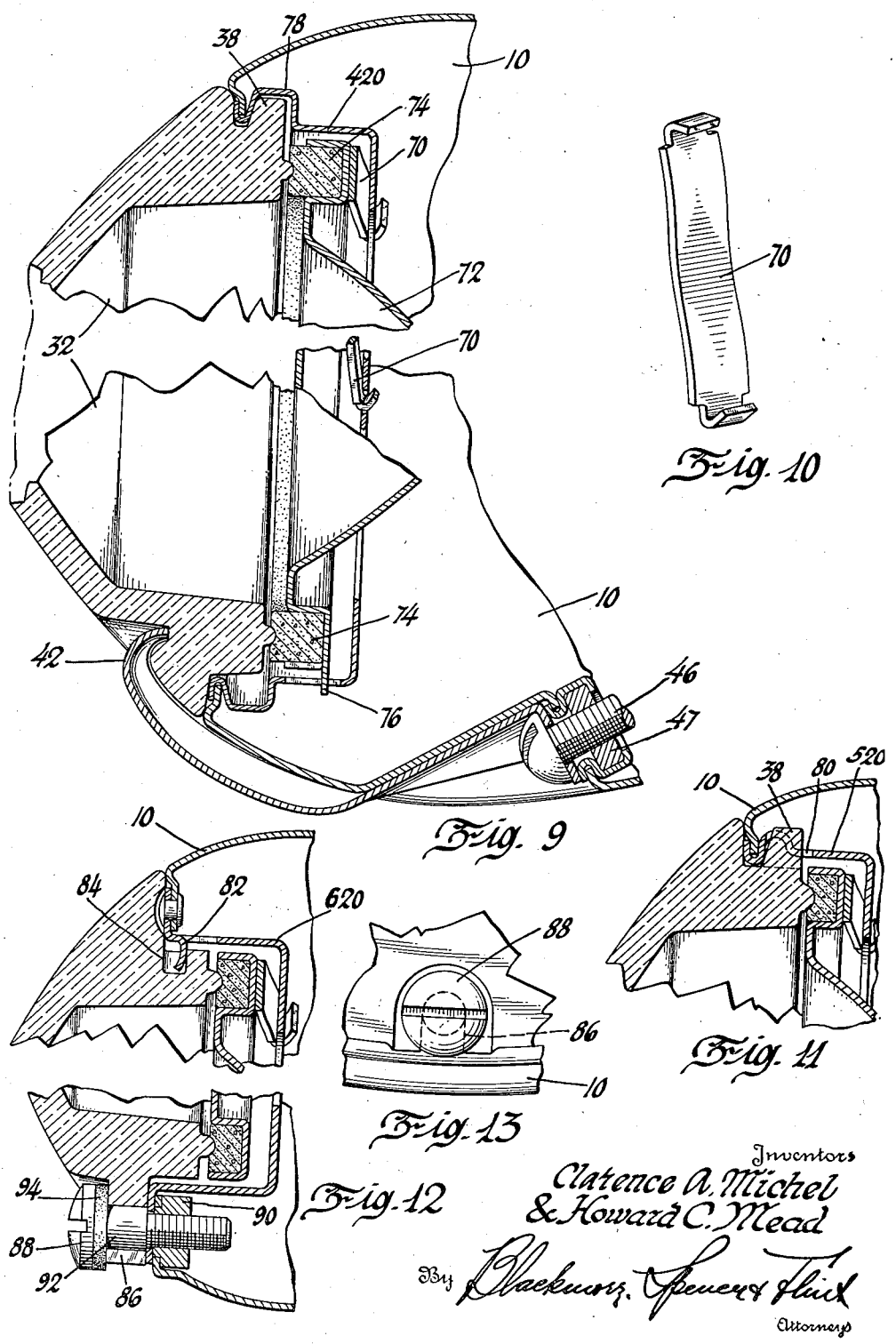

Patented Jan. 12, 1937

2,067,722

UNITED STATES PATENT OFFICE 2,067,722

DOORLESS HEADLAMP WITH LENS MOUNTED OUTSIDE OF HOUSING

Howard C. Mead and Clarence A. Michel, Anderson, Ind., assignors to General Motors Corporation, Detroit, Mich., a corporation of Delaware Application April 2, 1934, Serial No. 718,590

8 Claims. (Cl. 240—41.5)

This is an improvement on the headlamp disclosed and claimed in the prior application of C. A. Michel, S. N. 718,589, filed April 2, 1934.

In that application there is disclosed a headlamp of the doorless type characterized by the fact that the lens is secured directly to the lamp housing, being provided on one side with a projection or notch interlocking with the housing and at the other side with suitable fastening means which serves to draw the lens into engagement with the open end of the housing. In that application there is likewise disclosed a ring secured to the interior of the lamp housing and acting as an abutment for springs which yieldingly press the lens outwardly into engagement with the housing.

According to the present invention the ring is of the split expanding type and is adapted to be contracted for insertion into the housing and to thereafter expand into interlocking engagement with the housing. In one form of the invention the ring itself is of such construction as to exert spring pressure against the lens but if desired the ring may support separate springs for this purpose.

Other features will be described in connection with the following drawings in which:

Figure 1 is a side view, partly in section, of an automobile headlamp embodying our invention.

Figure 2 is a front view of a portion of the expanding ring used in the headlamp of Figure 1.

Figure 5 is a view similar to Figure 3 showing a modification.

Figures 6, 7 and 8 are sectional views showing further modifications.

Figure 9 is a view similar to Figure 3 showing a further modified form.

Figure 10 is a detail of the reflector engaging spring of Figure 9.

Figure 11 is a section showing a modification.

Figure 12 is a vertical section after the manner of Figure 9 showing a further modification.

Figure 13 is a front view of the securing means of Figure 12.

Figure 14 shows a modified sealing arrangement.

Figures 3, 4:
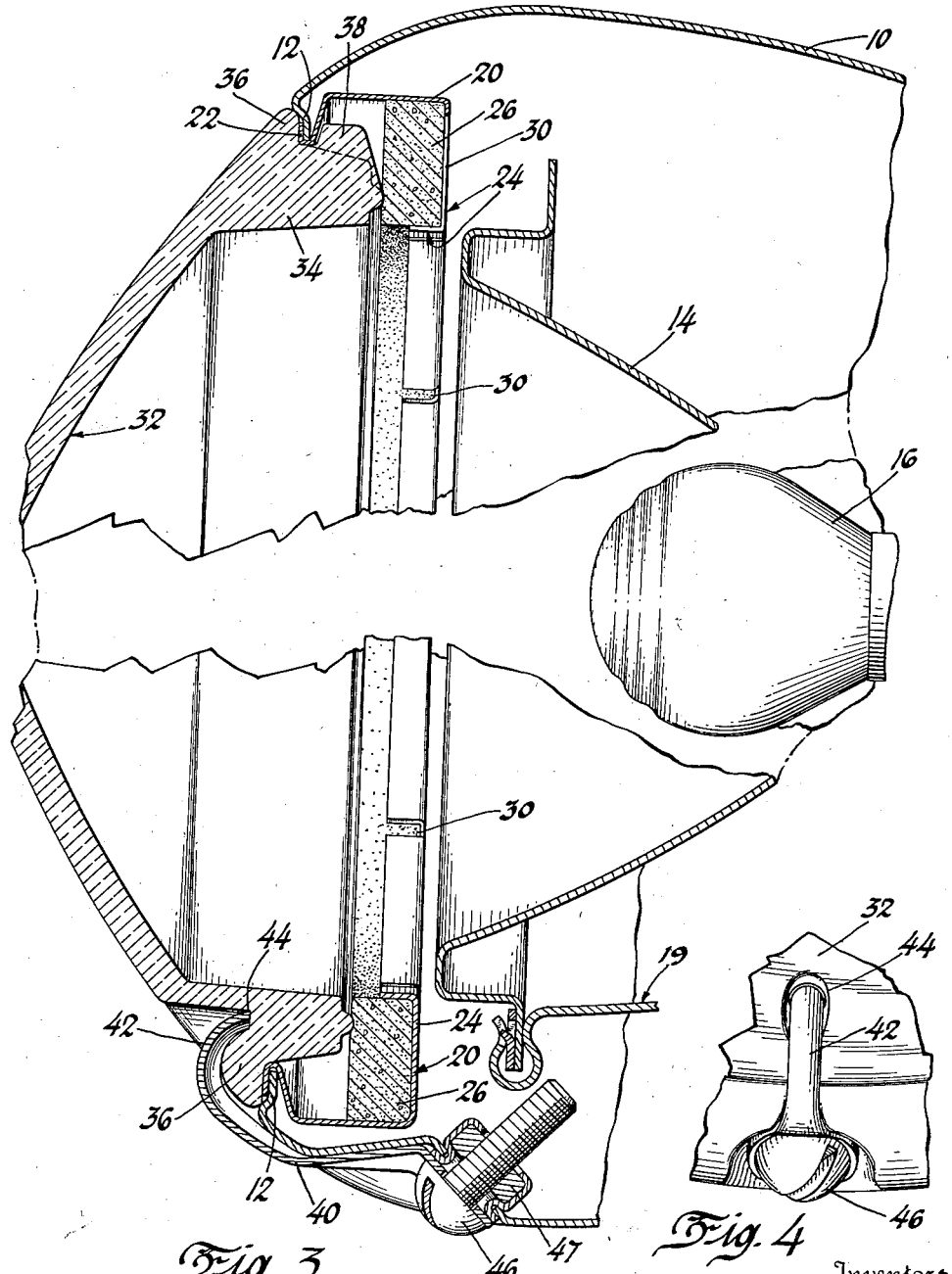
Figure 3 is an enlarged vertical section of the lamp of Figure 1 with the central portion broken away to permit the use of a larger scale.
Figure 4 is a front view of the lens fastening means used at the bottom of Figure 3.

10 indicates the headlamp housing which may be of any desired shape, and is provided at its open end with an inturned flange 12. Within the housing is mounted a reflector 14 provided with a light source preferably in the form of a two filament bulb 16. Suitable means indicated at 18 and 19 may be employed for adjustably mounting the reflector in the housing, this means preferably taking the form described and claimed in copending application S. N. 723,833, filed May 4, 1934, the supporting devices 18 may be mounted as shown in a radially split expanding ring 20 but it may prove more convenient to mount them in a separate member or members secured to the interior of housing 10.

Ring 20 has at its forward edge a U-shaped flange 22 interlocked with the flange 12. The rear portion of the expanding ring 20 is provided with an L-shaped flange 24. In the channel formed by the L-shaped flange and the body of the ring 20 is arranged a gasket 26. The L-shaped flange 24 is provided with a series of radial slots 30 for the purpose of giving increased resiliency to the flange. Lens 32 which may be of convex type is provided with a rearwardly extending flange 34 which preferably takes the form of a section of a cone having its axis parallel to the axis of the lens. The lens is also provided with a radial flange 36, and at its top only with a radial lug 38 spaced from the flange 36 so as to provide a notch to receive the interlocked flanges 12 and 22 on the housing and expanding ring, respectively.

In inserting the lens into the housing, it will be apparent that the notch is engaged with the interlocked flanges in the manner shown in Figure 3, and thereafter the lens may be swung downwardly about the bottom of the notch as a fulcrum into place, the conical flange 34 snugly fitting within the opening in the lamp housing and the rear face of the flange 36 engaging the front edge of the housing.

To hold the lens in position a clip 40 is provided having a hooked end 42 engaging in a socket 44 in the bottom of the lens. The opposite end of clip 40 is provided with an aperture to receive a fastening means such as screw bolt 46 in threaded engagement with nut 47 fixed in the lamp housing, adapted to clamp the clip in engagement with the lens and the lens in engagement with the housing. The clip also holds the lens against rotation.

An important feature of this invention consists in the spring action of the L-shaped flanges 24. These portions of the expanding band 20 become resilient as a result of the forming action, and acquire spring characteristics. Advantage is taken of this spring action by proper design of the parts so that the gasket 26 is at all times pressed with considerable force against the lens 32, and the lens is thus firmly held in the housing.

In Figure 5 we have shown a modification characterized chiefly by the fact that the L-shaped flange 24' serves as the seat for the reflector 50 which is provided with a peripheral groove 52 receiving a gasket 54. The reflector 50 may be held against rotation in its mounting by means of tab 56 bent down from the reflector and passing through an aperture in the expanding ring 20'.

In Figure 6 we have shown a slight modified form of expanding ring, and have numbered it 120. This ring is provided with an integral bead 58 which extends between the lens 32 and the housing for purposes of ornamentation.

In Figure 7 we have shown another slight modification of expanding ring which we have numbered 220. This ring receives a gasket 60 which may be of rubber, and is so shaped as to snugly fit an L-shaped groove 62 in the periphery of the lens. In this form of the invention the resilience of the rubber serves to hold the lens snugly in place.

In the modification shown in Figure 8 the expanding ring here numbered 320 is further modified in that the L-shaped rubber gasket 64 is secured to the axially extending portion thereof by means of rivets, or the like, and the other flange of the gasket bears yieldingly against the lens and tends to hold it in place.

In Figure 9 there is illustrated a further modification in that the expanding ring 420 is provided at its edge with an inwardly extending flange on which are mounted bowed leaf springs 70 on which rest the grooved edge of the reflector 72. One of the springs is shown in Figure 10. Within the groove is arranged the usual gasket 74. The springs 70 apply pressure to the reflector, gasket and lens making a tight assembly. In this form of the invention the ring 420 may be slotted to receive a lug 76 on the edge of the reflector to secure it against rotation.

It will be noted in the form shown in Figure 9 that the expanding ring 420 is grooved as at 78 to receive the lug 38 on the lens. In the modification shown in Figure 11 the expanding ring 520 is notched as at 80 to permit passage of the lug 38. This change makes it possible to do away with the groove 78 of the previous form if desired.

In Figures 12 and 13 there is shown a further slight modification. Here the expanding ring 620 is provided at its upper portion with a downwardly extending lug 82 received in socket 84 formed in the top of the lens. The bottom of the lens is provided with notch 86 which receives screw bolt 88 passing through an aperture in the outer radial flanged portion of ring 620 and threaded into the housing in any suitable manner as by engaging nut 90 fixed thereto. The bolt 88 is preferably provided with a metal collar 92 and with flexible washer 94 to prevent the application of so much pressure to the lens by screwing up the bolt as would cause breakage of the lens. The assembly of reflector and gasket may be substantially the same as that shown in Figure 9.

In Figure 14 there is shown a further modification of sealing arrangement. The construction is substantially the same as that of Figures 1 and 3 except that the gasket 126 is in the form of an annulus of inverted U shape in cross-section and is preferably made of rubber or other flexible material. Bowed springs 70 of the type shown in Figure 10 have their ends engaged with the flange 130 and their mid portion bearing against the underside of the gasket. Springs are provided at circumferentially spaced points around the lens aperture and serve to maintain the gasket in sealing engagement with the lens even though it should lose its original resiliency.

Obviously our construction is capable of considerable modification. Thus, instead of having the annular band held in place by its own resiliency it could be secured in position by spinning it over the edge of the lamp body or by clinching it thereto. If desired the expanding band could be made discontinuous or have a portion omitted at the top, and a clip could be secured to the housing by soldering, riveting or welding to engage the lug at the top of the lens in the same manner that the expanding band performs this function. Many other modifications will occur to those skilled in the art.

We claim:

1. A lamp comprising a housing provided with a lens receiving opening having an inturned flange, a split expanding ring inserted within the housing, said ring being grooved to receive the flange on the housing and prevent axial separation thereof, a lens over the housing, a locating formation on the lens and adjustable lens engaging means circumferentially spaced from said locating formation for cooperation therewith in removably holding the lens in place.

2. A lamp comprising a housing, a split expanding ring inserted within the housing, interlocking portions on the ring and housing adapted to prevent axial separation thereof, a lens fitted in the ring and having a locating formation in interlocking engagement therewith at one point, and means circumferentially spaced from the locating formation for clamping the lens in position.

3. A lamp comprising a housing having a lens receiving opening, a ring interlocked with the housing, a reflector seated in the ring, a gasket between the reflector and lens, yielding means urging the reflector toward the lens, said ring having a socket therein, a lens having a projection seated in the socket, and means at the other side of the lens for clamping the lens to the housing.

4. A lamp comprising a housing having a lens receiving opening, an expanding ring fitted within the opening in interlocking engagement with the edge thereof, a lens provided at one side with means interlocking with the edge of the opening to prevent axial separation of the lens and housing, means at the other side of the lens for drawing the lens toward the housing and into clamping engagement therewith, and means associated with said ring for resiliently urging the lens into engagement with the housing.

5. A lamp comprising a housing having a lens receiving opening, an expanding ring fitted within the opening in interlocking engagement with the edge thereof, a lens provided at one side with means interlocking with the edge of the opening to prevent axial separation of the lens and housing, means at the other side of the lens for drawing the lens toward the housing and into clamping engagement therewith, said ring comprising a resilient portion adapted to exert yielding pressure on the lens to urge it outwardly of the housing.

6. A lamp comprising a housing having a lens receiving opening, an expanding ring fitted within the opening in interlocking engagement with the edge thereof, a less provided at one side with means interlocking with the edge of the opening to prevent axial separation of the lens and housing, means at the other side of the lens for drawing the lens toward the housing and into clamping engagement therewith, said ring comprising a resilient inturned flange, and a gasket on said flange engaging the lens and yieldingly urged against the lens by the spring action of the flange.

7. A lamp comprising a housing having a lens receiving opening, an expanding ring inserted within the housing and interlocked thereto, a lens fitting within the opening, locating means on the lens engaging the interlocked portion at one point only, other lens engaging means circumferentially spaced from the locating means and a portion of the ring extending down one face of the lens and being adapted to maintain axial pressure thereon to clamp the lens against the interlocked portion.

8. In a lamp, a housing provided with a circular opening having an inturned flange, a lens, socket means at the upper extremity of the flanged opening, a projecting lug on the lens to fit within the socket whereby the top of the lens is supported in assembled position and clamping means engaging the lens at a point diametrically opposite the lug to pull the lens into its ultimate clamped position over the opening.

HOWARD C. MEAD.
CLARENCE A. MICHEL.

CERTIFICATE OF CORRECTION.

January 12, 1937.

Patent No. 2,067,722.

HOWARD C. MEAD, ET AL.

It is hereby certified that error appears in the printed specification of the above numbered patent requiring correction as follows: Page 3, second column, after line 12, claim 8, and before the signatures to the specification, insert the following as claim 9:

9. A lamp comprising a housing having a lens receiving opening, an annular band in the housing in interlocking engagement therewith and having a socket formed therein, a lens having a projection received in the socket, and means at the opposite side of the lens for clamping the latter to the housing;

and that the said Letters Patent should be read with this correction therein that the same may conform to the record of the case in the Patent Office.

Signed and sealed this 16th day of March, A. D. 1937.

Henry Van Arsdale
Acting Commissioner of Patents.

(Seal)